(12) United States Patent
Shang et al.

(10) Patent No.: US 6,219,166 B1
(45) Date of Patent: Apr. 17, 2001

(54) OPTICAL RECEIVER SUITABLE FOR OPTICAL INTERCONNECTS

(75) Inventors: Alain Z. Shang, Brossard; Frank A. P. Tooley, Town of Mount Royal, both of (CA)

(73) Assignee: McGill University, Montreal (CA)

( * ) Notice: Subject to any disclaimer, the term of this patent is extended or adjusted under 35 U.S.C. 154(b) by 0 days.

(21) Appl. No.: 08/854,889

(22) Filed: May 12, 1997

(51) Int. Cl.$^7$ ................................................. H04B 10/06
(52) U.S. Cl. ............................................................ 359/189
(58) Field of Search .................................. 359/189, 194, 359/195, 161

(56) References Cited

U.S. PATENT DOCUMENTS

| 3,582,689 | 6/1971 | Smith et al. ............................ 307/297 |
| 5,548,434 | * 8/1996 | Shimonaka et al. ................... 359/161 |

OTHER PUBLICATIONS

A High–Speed Clamped Bit–Line Current–Mode Sense Amplifier, Travis N. Blalock and Richard C. Jaeger, IEEE Journal of Solid State Circuits, vol. 26, No. 4, (Apr. 1991) pp. 542–548.

622MHz Current–Mode Sense Amplifier, J. Alowersson and P. Andersson, Electronic Letters (Feb. 1, 1996) vol. 32, No. 3, pp. 154–156.

Clocked–Sense–Amplifier–Based Smart–Pixel Optical Receivers, IEEE Photonics Technology Letters, vol. 8, No. 8, (Aug. 1996) pp. 1067–1069.

Optical Receivers for Optoelectronic VLSI, IEEE Journal of Selected Topics in Quantum Electronics vol. 2, No. 1 (Apr. 1996), pp. 106–116.

Analysis and Design of Analog Integrated Circuits, Paul R. Gray and Robert G. Meyer, Second edition, John Wiley & Sons, pp. 244–246, p. 300.

Using Current Conveyors, Brett Wilson, Electronic & Wireless World (Apr. 1986) pp. 28–32.

Wideband Class AB (Push–Pull) Current Amplifier in CMOS Technology, Electronics Letters (Apr. 12, 1990) vol. 26, No. 8, pp. 543–544.

Fast CMOS Current Amplifier and Buffer Stage, Electronics Letters (Jun. 18, 1987) vol. 23, No. 13.

* cited by examiner

*Primary Examiner*—Leslie Pascal
(74) *Attorney, Agent, or Firm*—Venable; John P. Shannon

(57) ABSTRACT

An optical receiver comprises a photodetector for converting an optical signal incident thereupon into a corresponding electrical photodetector current and a current-mode circuit coupled to the photodetector for receiving the electrical current. The current-mode circuit is characterized by a very low impedance, low capacitance input. It provides an electrical output current corresponding to the photodetector current. This electrical output current is substantially independent of the input capacitance, in view of the very low input impedance and small voltage swings of the current-mode circuit. Consequently, the photodetector may have a relatively large area, which facilitates optical alignment of transmitters and receivers when the optical receiver is used in optical interconnects. The current-mode circuit may comprise a current conveyor, conveniently followed by a current-to-voltage converter and a thresholder for providing a digital output signal in dependence upon the photodetector current. Alternatively, the current mode circuit may comprise a sense amplifier providing directly a digital output signal varying in dependence upon the photodetector current.

10 Claims, 4 Drawing Sheets

OPTICAL RECEIVER SUITABLE FOR OPTICAL INTERCONNECTS

BACKGROUND OF THE INVENTION

1. Technical Field

This invention relates to optical receivers, especially but not exclusively optical receivers for use in optical interconnects.

2. Background Art

Optical interconnects are used to convert optical signals to electrical signals and vice versa. They are used in optical communications systems, for interconnections between equipment, such as computers, which transfer data at high rates, and within such equipment to transfer data between components such as integrated circuits.

The typical optical interconnect comprises an interconnect transmitter which converts electrical pulses representing digital data into pulses of light for transmission via an optical transmission path, which might be free space. An interconnect receiver at the other end of the transmission path converts the pulses of light back into electronic pulses for processing by electronic circuitry.

Optical interconnects for inter- or intra-computer communications may comprise a multiplicity of links requiring perhaps thousands of receivers in an array on a miniature device such as an integrated circuit. Consequently, such receivers must be small and have a low electrical power consumption, yet still be highly sensitive and fast.

A typical receiver comprises a photodetector to receive the light pulses and convert them into electrical pulses which will then be amplified and processed in known manner. The light-absorbing area of the photodetector is critical to the performance of the receiver. The input capacitance of the receiver is dominated by the capacitance of the photodetector, so it is usual for known optical receivers to have a detector with a small area, and hence small input capacitance, which will reduce the time constant and lead to improved bandwidth and sensitivity. Unfortunately, reducing the area of the photodetector makes it more difficult to align the input light beam onto the absorbing region of the photodetector. This can result in problems, especially where a large number of receivers must be provided in a small area, such as when interconnecting integrated circuits and other components.

SUMMARY OF THE INVENTION

An object of the present invention is to mitigate the afore-mentioned difficulties and provide an optical receiver which will tolerate a relatively high input capacitance for a given speed and sensitivity.

According to the present invention, there is provided an optical receiver comprising a photodetector unit for converting an optical signal incident thereupon into a corresponding electrical photodetector current and a current-mode circuit having a low impedance, low capacitance input coupled to the photodetector for receiving the electrical photodetector current, and a high impedance output for outputting an electrical output current corresponding to said electrical photodetector current.

The current-mode circuit may comprise a current conveyor, conveniently followed by a current-to-voltage converter and a thresholder for providing a digital output signal in dependence upon the photodetector current. Alternatively, the current-mode circuit may comprise a sense amplifier providing directly a digital output signal varying in dependence upon the photodetector current. The current conveyor or the sense amplifier, as the case may be, may use CMOS devices.

In preferred embodiments, the photodetector unit comprises a pair of photodetectors, for example PIN photodiodes, connected so as to provide a differential optical input stage.

Embodiments of the invention will now be described by way of example only and with reference to the accompanying drawings in which like components have the same reference numbers.

DESCRIPTION OF THE PREFERRED EMBODIMENTS

Figure 1:
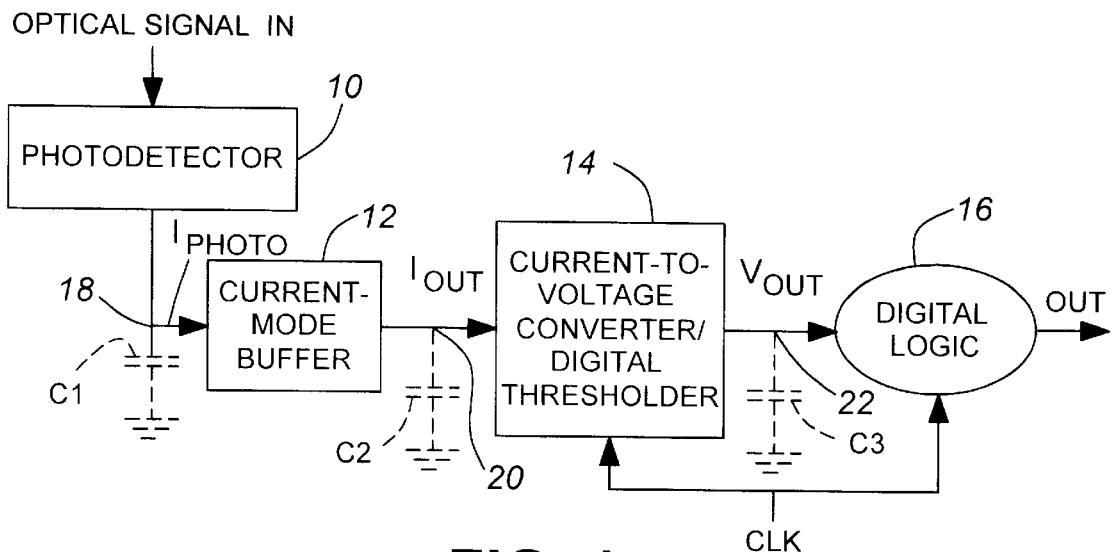
FIG. 1 is a block schematic diagram of a first embodiment of the invention in the form of an optical receiver comprising with a current-mode buffer and a current-to-voltage conveyor.

Referring to FIG. 1, an optical receiver comprises a photodetector unit 10, current-mode buffer 12, current-to-voltage converter and thresholding circuit 14 and digital processing circuit or logic 16. Circuits 14 and 16 are operable by a common clock signal CLK.

A capacitor C1, shown in broken lines, represents the capacitance at a node 18 between the photodetector unit 10 and the current-mode buffer 12, i.e. the capacitance of the photodetector unit 10 and the input capacitance of the buffer 12. The value of C1 is relatively high (e.g. 100's of femtoFarad—1 picofarad) as compared with either the capacitance C2 at the node 20 between current-mode buffer 12 and current-to-voltage converter 14 or the capacitance C3 at the node 22 between converter/threshold circuit 14 and digital logic circuit 16, which might be 5–10 femtoFarads. Capacitances C2 and C3 also are represented by capacitors shown in broken lines.

The photodetector unit 10 converts the optical input signal into a corresponding photodetector current $I_{photo}$, which it supplies to the low-impedance input of current-mode buffer 12. The buffer 12, which has a very low output capacitance, say 10 fF, supplies a corresponding output current $I_{out}$ to the current-to-voltage converter/digital thresholder 14, which converts it into a corresponding output signal in the form of a digital voltage which it applies to digital logic circuit 16 for further processing. The current-to-voltage converter may be a low-, high- or transimpedance amplifier and the digital thresholder may be a series of appropriately-sized inverters.

Figure 2:
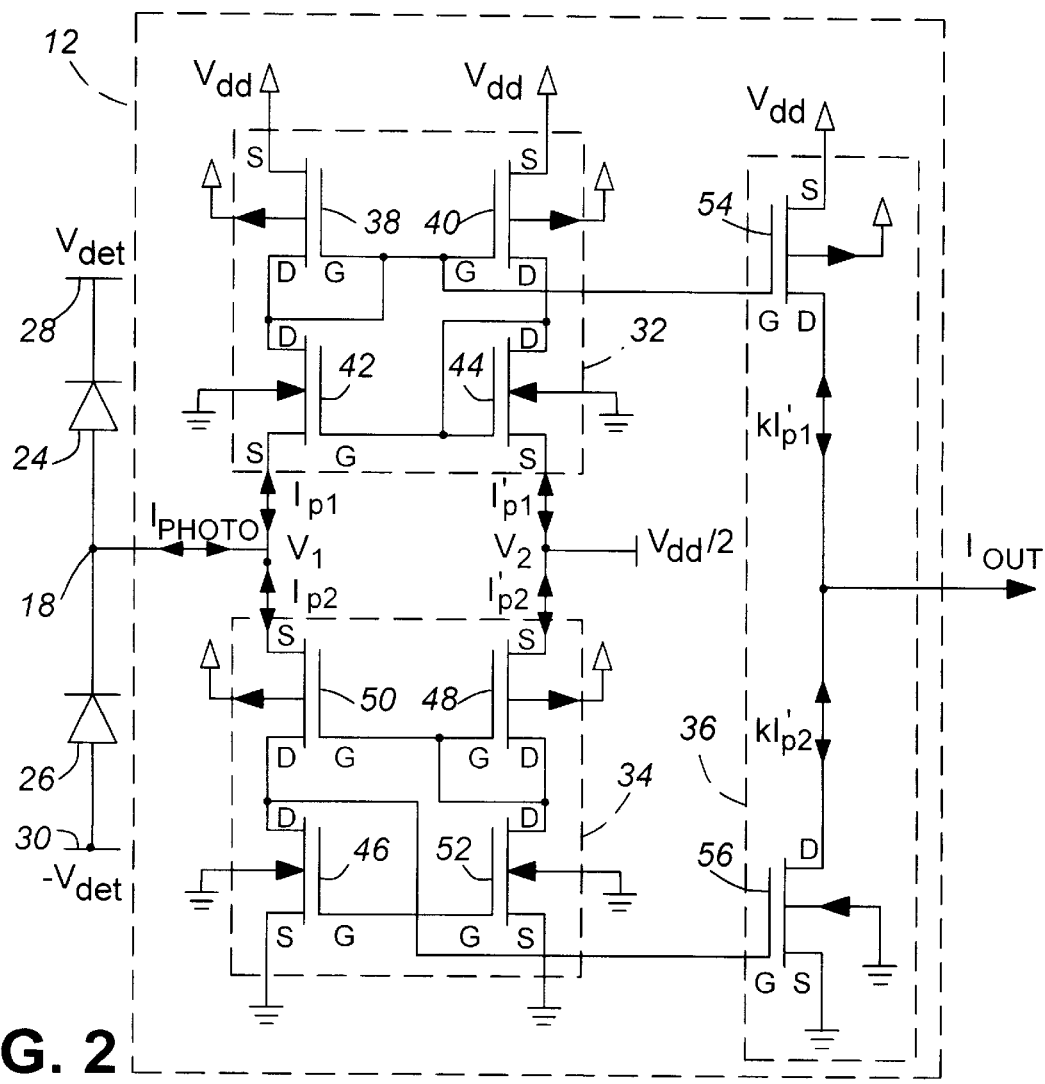
FIG. 2 is a schematic diagram showing in more detail the current-mode buffer of the optical receiver of FIG. 1.

FIG. 2 shows the photodetector unit 10 and current-mode buffer 12 in more detail. The photodetector unit 10 is represented by two photodiodes 24 and 26 (e.g. PIN diodes) connected in series between supply rails 28 and 30 which apply detector bias voltages $V_{det}$ and $-V_{det}$ to the cathode of diode 24 and anode of diode 26, respectively. The node 18 between the two photodiodes 24 and 26 is connected to current-mode buffer 12. When a pair of differentially encoded optical beams (i.e. one bright (1) when the other is dim (0)) are incident upon the photodiodes 24 and 26, respectively, each generates a corresponding photocurrent which is a component of a bipolar input current $I_{photo}$ which flows into or out of the node 18.

The current-mode buffer 12 comprises a push-pull current conveyor formed by two "stacked" CMOS current mirrors 32 and 34 and an output stage 36. The current mirror 32 is formed by two p-channel MOS field effect transistors 38 and 40 and two N-channel MOSFETs 42 and 44. Each of the PMOSFET 38 and the NMOSFET 44 has its drain and gate connected together. The gates of PMOSFETs 38 and 40 are connected together and to the drain of FET 42. Likewise, the gates of NMOSFETs 42 and 44 are connected together and to the drain of FET 40. The second current mirror 34 is of similar construction, comprising MOSFETs 46, 48, 50 and 52, interconnected in a similar, complementary manner.

The two current mirrors 32 and 34 are "stacked," i.e. the sources of MOSFETs 42 and 50 are connected together at node 18 and the sources of MOSFETs 44 and 48 are connected together; the sources of MOSFETs 38 and 40 are connected to a supply rail at voltage $V_{dd}$, while the sources of MOSFETs 46 and 52 are grounded. The sources of MOSFETs 44 and 48 are biased at $V_{dd}/2$. The detailed operation of the current mirrors themselves will not be described here, since such circuits have been disclosed in Electronics Letters, 12th. April 1990, Vol. 26, No. 8, for example. For further information about current conveyors and their operation, the reader is directed to such article and to U.S. Pat. No. 3,582,689 (issued Jun. 1971), naming as inventors K. C. Sedra and A. Sedra, and an article by B. Wilson entitled "Using Current Conveyors," *Electronics and Wireless World* (April 1986).

The output stage 36 comprises two more MOSFETs 54 and 56. The source of MOSFET 54 is connected to the supply rail $V_{dd}$ and that of MOSFET 56 is grounded. The drains of MOSFET 54 and MOSFET 56 are connected together to the output (node 20). The gate of output MOSFET 54 is connected to the gates of MOSFETs 38 and 40 in current mirror 32 and the gate of output MOSFET 56 is connected to the gates of MOSFETs 46 and 52 in current mirror 34.

In operation of the current conveyor, the currents are mirrored from channel to channel. Thus, the components $I_{p1}$ and $I_{p2}$ of input current $I_{photo}$, which are input to current mirror 32 and current mirror 34, respectively, are "mirrored" or replicated as currents $I_{p1}'$ and $I_{p2}'$ in the channels of MOSFETs 40 and 44 of current mirror 32 and MOSFETs 48 and 52 of current mirror 34, respectively. The corresponding currents $kI_{p1}'$ and $kI_{p2}'$ at the drains of output MOSFETs 54 and 56, respectively, are proportional to $I_{p1}$ and $I_{p2}$, respectively, but differ in amptitude according to the gain of the output stage 36. Such gain is determined by the ratio between the channel width of MOSFET 54 and MOSFET 38, and the ratio between the channel width of MOSFET 56 and MOSFET 46. This gain improves the overall sensitivity of the receiver by providing more gain to the input optical signal. The difference between the output current components $kI_{p1}'$ and $kI_{p2}'$ is the output current $I_{out}$, which is outputted via node 20 and replicates the bipolar input current $I_{photo}$.

Because FETs 42, 44, 48 and 50 are matched, a virtual short exists between the input node 18 and the sources of FETs 44 and 48. Consequently, the input impedance of the current-mode buffer 12 is very low, since the voltage swings at the high15 capacitance input node 18 are reduced. The very low input impedance makes the performance less dependent upon input capacitance.

Figure 3:
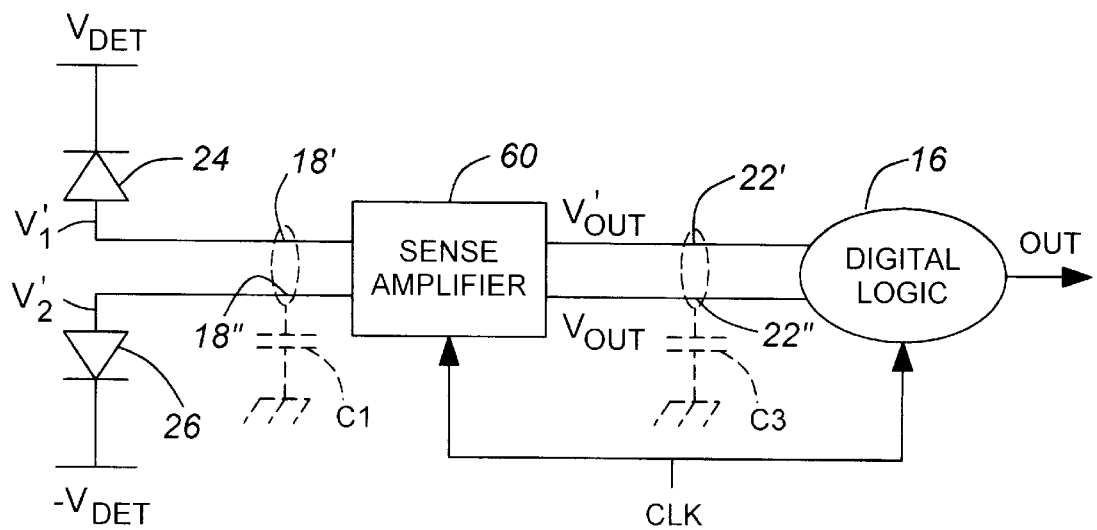
FIG. 3 is a block schematic diagram of a second embodiment of the invention which comprises a sense amplifier constituting a current-mode buffer and current-to-voltage convertor.

A second, more compact embodiment of the invention will now be described with reference to FIG. 3 in which, as before, a differential optical input is provided by a photodetector unit comprising a pair of photodetectors 24 and 26. In this embodiment, however, the photodetectors 24 and 26 are connected to a compact current-mode sense amplifier 60 which replaces the current conveyor unit 12 and current-to-voltage converter 14 of the embodiment of FIGS. 1 and 2. The sense amplifier 60 comprises a current amplifier with a very low input impedance, and operates as a differential comparator to provide a digital output voltage dependent upon the "sense" of the input current. This embodiment differs from the current conveyor embodiment of FIG. 2, in that the input is not only differential optically but also differential electrically, i.e. each of the two photodetectors 24 and 26 is connected to its own node, 18' or 18".

Figure 4:
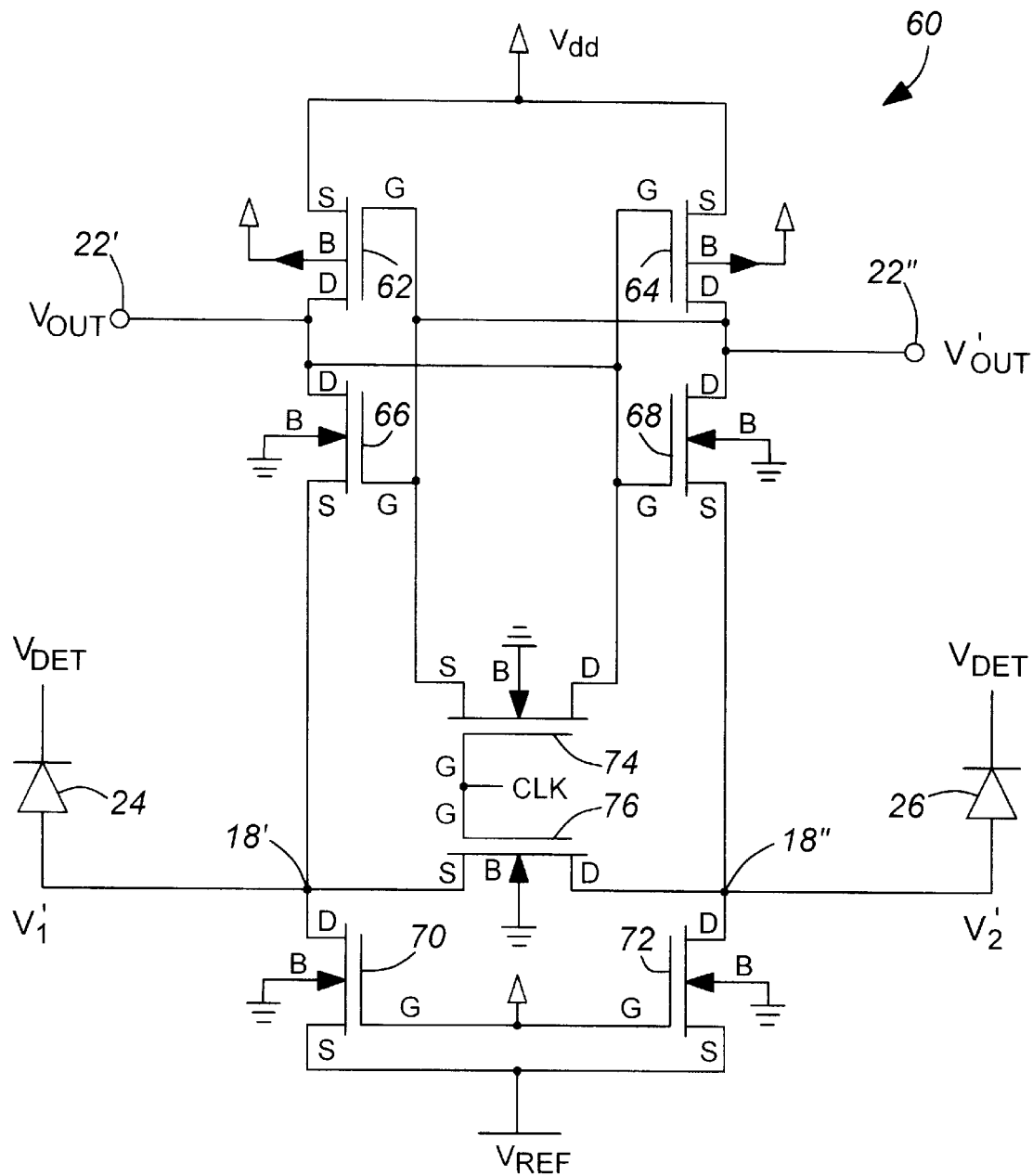
FIG. 4 is a schematic diagram of the sense amplifier of the optical receiver of FIG. 3.

As shown in FIG. 4, the sense amplifier 60 comprises two p-channel MOS field effect transistors 62 and 64 and two n-channel MOS field effect transistors 66 and 68 connected to form cross-coupled inverters. Thus, the drains of NMOSFETs 62 and 66 are connected together and their sources connected to the supply rail $V_{dd}$ and to photodetector 24, respectively. Likewise, the drains of MOSFETs 64 and 68 are connected together and their sources are connected to the supply rail $V_{dd}$ and photodetector 26, respectively. The gates of NMOSFETs 62 and 66 and the drains of MOSFETs 64 and 68 are connected together. In a similar manner, the gates of MOSFETs 64 and 68 and the drains of FETs 62 and 66 are connected together. The digital output voltages $V_{out}$ and its complement $V'_{out}$ at the drains of MOSFETs 62 and 66 and the drains of MOSFETs 64 and 68, respectively, are supplied to output nodes 22' and 22", respectively.

Two additional NMOSFETs 70 and 72 have their source electrodes connected together to a source of a reference voltage $V_{ref}$ and their gates connected to the supply rail $V_{dd}$. Their drains are connected to the photodetectors 24 and 26, respectively. The value of voltage $V_{ref}$ is such that these MOSFETs 70 and 72 are biased into their linear operating regions and help to keep the input potentials $V_1'$ and $V_2'$ at the input to the sense amplifier 60 close to each other, thus creating a "virtual short" at the inputs, i.e. between PIN diodes 24 and 26.

A further NMOSFET 74 has its source and drain connected to the gates of NMOSFETs 66 and 68, respectively, and its gate connected to a source of a clock signal CLK. Another NMOSFET 76 has it source and drain connected to the sources of NMOSFETs 66 and 68, respectively, and thus to the photodetectors 24 and 26, respectively. Its gate is connected to the same source of clock signal CLK.

In operation, NMOSFETs 74 and 76 short-circuit the output and input, respectively, in dependence upon the clock signal CLK. Thus, when the clock signal CLK is high, the input and output are shorted and the sense amplifier is in a metastable state wherein the output "floats". As soon as the clock signal CLK goes low, the shortcircuit is removed, the sense amplifier 60 becomes highly sensitive to the input data; the output switches between digital levels in response to very small differences in optical power at the differential input. Hence, the sense amplifier inherently performs both current-to-voltage conversion and thresholding.

Figure 5:
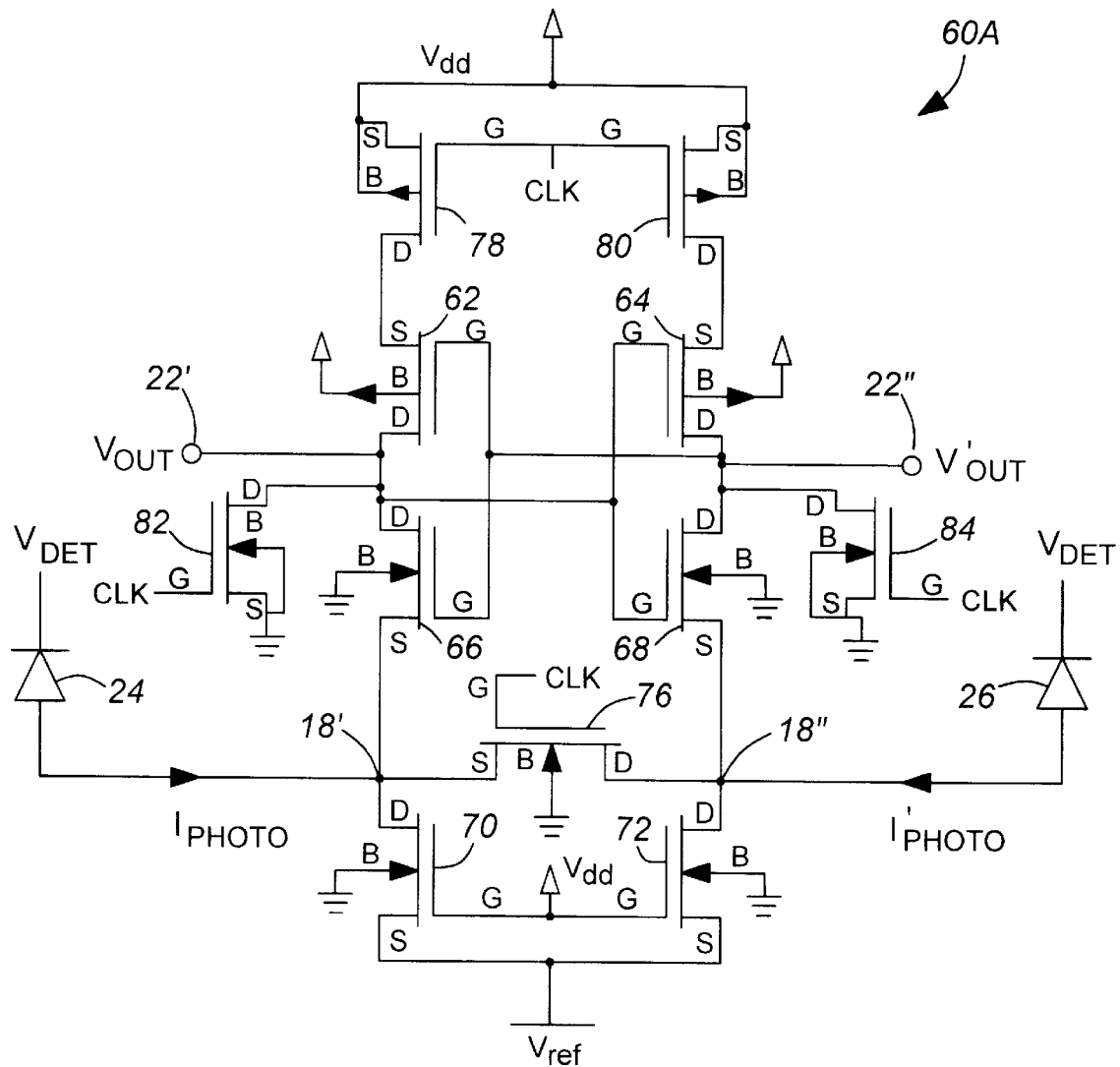
FIG. 5 is a schematic diagram of a third embodiment of the invention comprising a modified sense amplifier.

FIG. 5 shows a third embodiment of the invention which comprises a modification of the sense amplifier of FIG. 4. The sense amplifier 60A of FIG. 5 differs from that of FIG. 4 in two ways. Firstly, two additional PMOSFETS 78 and 80, clocked by the clock signal CLK, are interposed between NMOSFETs 62 and 64 and the supply rail $V_{dd}$. Thus, the drains of PMOSFETS 78 and 80 are connected to the sources of PMOSFETS 62 and 64, respectively, while the sources of additional PMOSFETS 78 and 80 are connected to the supply rail $V_{dd}$. Secondly, the NMOSFET 74 which, in FIG. 4, short-circuits the output, is replaced by two NMOSFETs 82 and 84 which are both clocked by the clock signal CLK. NMOSFET 82 has its drain connected to the drains of NMOSFET 66 and PMOSFET 62 and its source grounded. Likewise, NMOSFET 84 has its drain connected to the drains of NMOSFET 68 and PMOSFET 64 and its source grounded. Thus, the NMOSFETs 82 and 84 periodically ground the outputs in dependence upon the state of the clock signal CLK. MOSFETs 78 and 80 charge the output nodes during the metastable states and disconnect the receiver from supply rail $V_{dd}$ during the "evaluate" period. The evaluate period is the time during which the output signal is valid. When clock signal CLK is high, MOSFETs 78 and 80 are "closed" and the receiver is in a metastable state in which the output "floats" at a level between zero and $V_{dd}$. When clock signal CLK goes low, MOSFETs 78 and 80 are "open" and the receiver is in the "evaluate" condition in which it is very sensitive to input current changes. Very small input changes will cause the output to switch to zero or $V_{dd}$.

This third modified embodiment is less susceptible to noise (right after the metastable state) and is less prone to latching error. Moreover, this receiver can be operated with a truly single phase clock and can be used in conjunction with dynamic logic, hence providing low power in-situ processing of received data.

Figure 6:
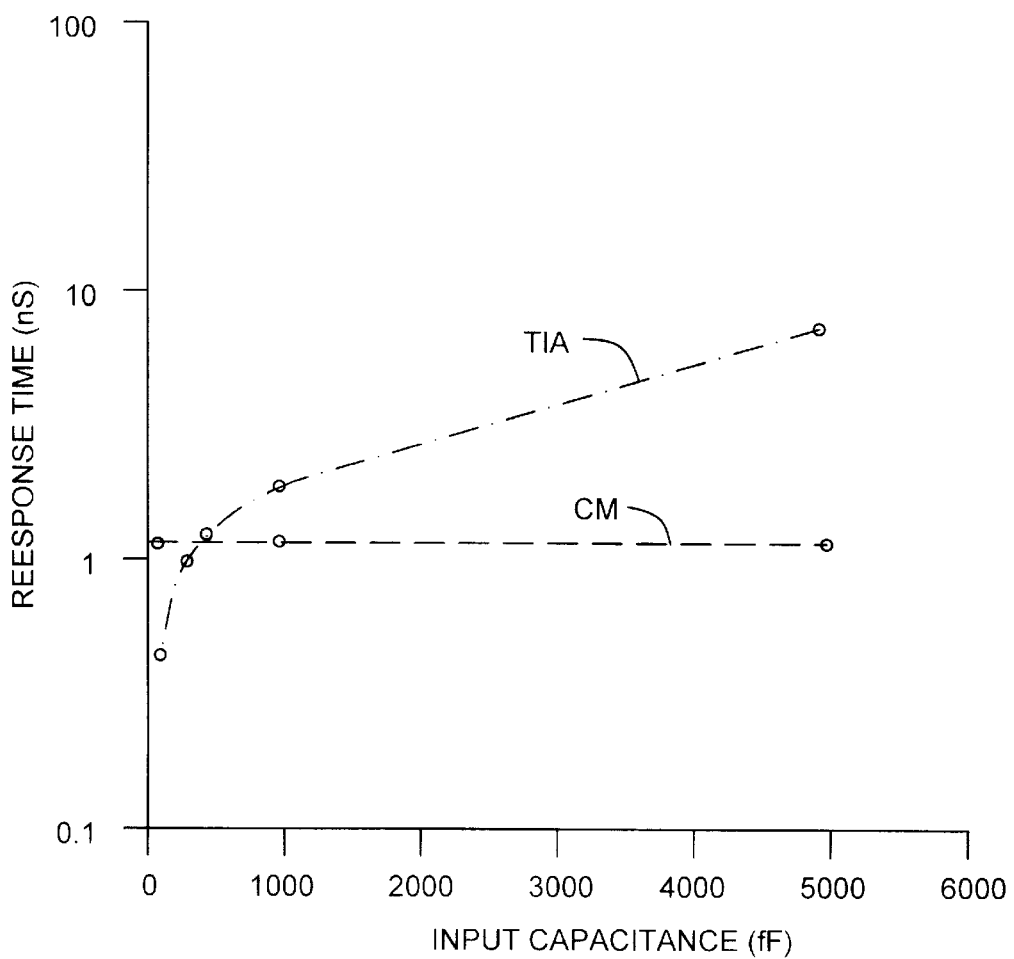
FIG. 6 shows the relationship between response time and input capacitance for current-mode receivers of the present invention and a voltage-mode receiver such as a transimpedance amplifier (TIA.).

FIG. 6 illustrates, by way of example, the relationship between response time and input capacitance for optical receivers of the present invention as compared with an optical receiver which does not use a current-mode buffer. In FIG. 6, the response of the current-mode receiver (CM) is shown to be substantially independent of input capacitance. This is not the case for the transimpedance amplifier (TIA).

An advantage of embodiments of the present invention is that, because the current-mode buffer 12 has a very low input impedance, its speed is substantially independent of the input capacitance, which includes the capacitance of the photodetectors. Consequently, the photodetectors may each have a relatively large lightabsorbing area, which facilitates optical alignment of transmitters and receivers when the optical receiver is used in optical interconnects. Another advantage is that they permit greater freedom in the placement of the photodetectors on the chip plane.

Any of the embodiments disclosed herein can be interfaced directly with dynamic or static digital logic circuitry for further processing.

It should be appreciated that, although the preferred embodiments disclosed herein use either a current conveyor with an analog amplifier (current-to-voltage converter) or a sense amplifier, the invention is not limited to these implementations. Rather, it is envisaged that alternative current-mode circuits might be employed to provide a low impedance interface to the photodetectors so as to reduce the effect of photodetector capacitance upon the output signal. Similar topologies (of current conveyors or sense amplifiers) can be implemented using metal semiconductor field-effect translators (MESFETs) or bipolar junction Transmitters (BJTs). Moreover, the current conveyor or sense amplifier could be implemented with different topologies.

Although embodiments of the invention have been described and illustrated in detail, it is to be clearly understood that the same are by way of illustration and example only and not to be taken by way of the limitation, the spirit and scope of the present invention being limited only by the appended claims.

What is claimed is:

1. An optical receiver comprising a photodetector unit for converting an optical signal incident thereupon into a corresponding electrical photodetector current and a current-mode circuit having a very low impedance, low capacitance input coupled to the photodetector unit for receiving the electrical photodetector current and an output for outputting an electrical output signal corresponding to said electrical photodetector current.

2. An optical receiver according to claim 1, wherein the current-mode circuit comprises a current conveyor.

3. An optical receiver according to claim 2, wherein the current conveyor comprises a pair of stacked current mirrors having their respective inputs connected to the photodetector unit and their respective outputs connected to an output stage for combining currents from said outputs to provide an output current varying in dependence upon said electrical photodetector current.

4. An optical receiver according to claim 1, further comprising a current-to-voltage converter coupled to said output of the current-mode circuit for converting said electrical output current to a corresponding output voltage.

5. An optical receiver according to claim 1, further comprising a current-to-voltage converter coupled to the output of the current-mode circuit for converting said electrical output current into a corresponding voltage, and a threshold device for sampling said voltage to provide a digital signal which varies in dependence upon said photodetector current.

6. An optical receiver according to claim 1, wherein the current-mode circuit comprises a current conveyor, the receiver further comprising a current-to-voltage converter coupled to the output of the current conveyor for converting said electrical output current to a corresponding voltage and a threshold device for sampling said voltage to provide a digital output signal which varies in dependence upon said photodetector current.

7. An optical receiver according to claim 2, wherein the current conveyor comprises a pair of stacked current mirrors having their respective inputs connected to the photodetector unit and their respective outputs connected to an output stage for combining currents from said outputs to provide an output current varying in dependence upon said electrical photodetector unit, the receiver further comprising a current-to-voltage converter coupled to said output stage for converting said output current to a corresponding voltage and a threshold device for converting said voltage into a digital output signal which varies in dependence upon said photodetector current.

8. An optical receiver according to claim 1, wherein the current-mode circuit comprises a sense amplifier having an input connected to the photodetector unit and having an output for providing a digital output signal varying in dependence upon said electrical photodetector current.

9. An optical receiver according to claim 8, wherein the photodetector unit comprises first and second differentially connected photodetectors, and the sense amplifier comprises cross-coupled first and second inverters having respective inputs connected to the first and second photodetectors, respectively, means for maintaining such inputs at substantially the same potential, and switching means responsive to a clock signal for selectively short-circuiting the inputs and outputs of the cross-coupled inverters, such that the outputs of the cross-coupled inverters each comprise a digital voltage varying in dependence upon the currents output from the photodetectors.

10. An optical receiver according to claim 8, wherein the photodetector unit comprises first and second differentially connected photodetectors and the sense amplifier comprises cross-coupled first and second inverters having respective inputs connected to the first and second photodetectors, respectively, means for maintaining such inputs at substantially the same potential, first switching means responsive to a clock signal for selectively short-circuiting the inputs of the inverters and second switching means for selectively grounding respective outputs of the inverters.

* * * * *